T. A. DAVIS.
ANTIFREEZING APPLIANCE FOR WATER PIPES.
APPLICATION FILED JUNE 7, 1918. RENEWED JUNE 20, 1919.

1,328,649.  Patented Jan. 20, 1920.

Inventor;
Thomas A. Davis
By W. H. Wills
Atty.

UNITED STATES PATENT OFFICE.

THOMAS A. DAVIS, OF SAN ANTONIO, TEXAS.

ANTIFREEZING APPLIANCE FOR WATER-PIPES.

1,328,649.  Specification of Letters Patent.  Patented Jan. 20, 1920.

Application filed June 7, 1918, Serial No. 238,681. Renewed June 20, 1919. Serial No. 305,703.

*To all whom it may concern:*

Be it known that I, THOMAS A. DAVIS, a citizen of the United States, residing at San Antonio, in the county of Bexar and State of Texas, have invented certain new and useful Improvements in Antifreezing Appliances for Water-Pipes, of which the following is a specification.

This invention relates to water mains and pipes, and pertains especially to an antifreezing appliance for water supply and drain pipes of residences and buildings.

The object of the invention is to provide a novel and peculiar device interposed between and connected with the main and service lines of a house supply water system for the purpose of avoiding interference with the operation of the service and drain pipes of a dwelling by the water freezing therein, and to furnish in said device a check valve automatically controlled by water pressure, and operated by expansion of a body of water freezing in a section of the device.

A further object of the invention is to provide an anti-freezing device having a portion thereof supplied with a body of water for freezing, so that the expansion by freezing of such body will fracture, rupture or displace a certain element of the device, and thereby automatically release a check valve for closing communication between the main line and the house line or system.

A still further object of the invention is to provide in an anti-freezing device means for supplying a section of the device with a body of water from a main line for freezing therein so as to release a check valve by freezing expansion of said body for closing communication between the main line and the house line, and to furinsh a by-pass between such lines during closed position of the valve.

Various other objects, advantages and improved results are attainable in the practical application of the invention hereinafter fully described.

In the accompanying drawings forming part of this application:

The same reference characters denote the same parts throughout the several views of the drawings.

Figure 1:
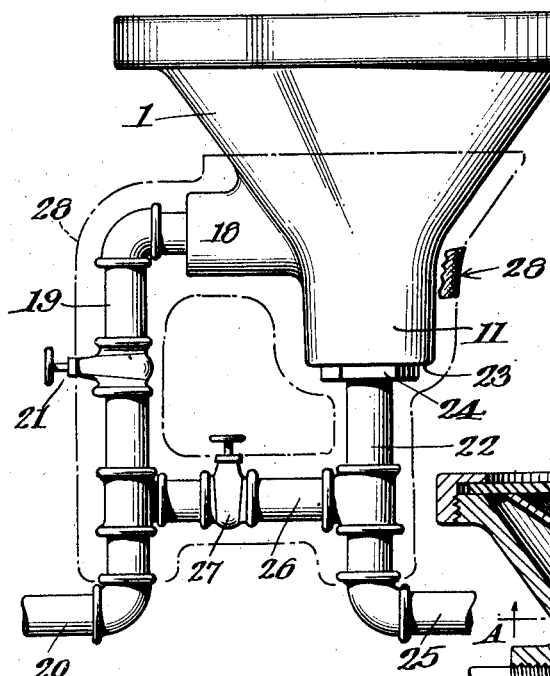
Figure 1 is an elevation showing the application of the invention to and between a main water supply pipe and a house pipe, the dotted lines indicating a protecting covering or jacket.
Figure 5:
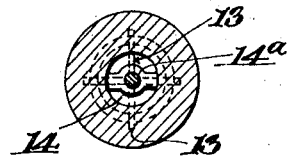
Fig. 5 is a similar view taken on the dotted line B—B, Fig. 2.
Figure 2:
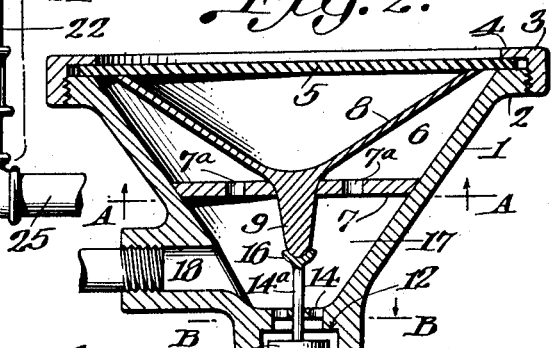
Fig. 2 is a central sectional view of the device with the pipes broken away and showing the check valve open for supplying water from the main line to the house line.
Figure 3:
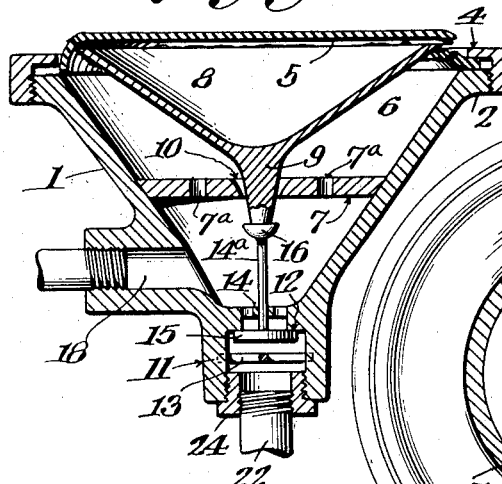
Fig. 3 is a similar view showing the parts in position as to prevent freezing in the pipes.
Figure 4:
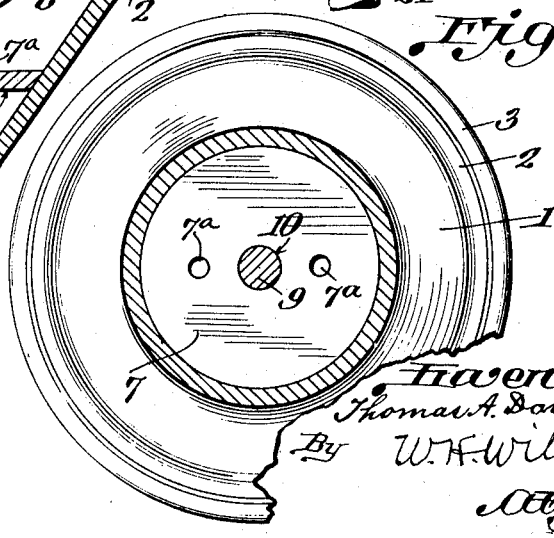
Fig. 4 is a cross section taken on the dotted line A—A, Fig. 2.

In carrying out my invention I employ preferably a conical casing 1 having an outer screw threaded top rim 2 for a clamping ring 3 which has an annular flange 4 for clamping a fragile or soft metal disk 5 upon the rim 2. The upper portion or section of the casing 1 constitutes a water freezing chamber 6 by reason of a removable partition 7 fitting within the casing 1 and forming a bottom for said chamber. The upper portion of the chamber 6 is occupied by an abutment comprising a cone-shaped shell 8 having a central stem 9 extending through a central opening 10 of the partition 7 and depending from the partition. The partition is provided with apertures 7$^a$ forming ducts for the passage of water under pressure into the freezing chamber 6. The upper edge of the abutment shell 8 is engaged by the cap plate or disk 5 for holding the cone and its stem in fixed position until the displacement, fracture or rupture of the disk, as will be hereinafter explained.

The lower end of the casing 1 has a valve chamber 11 comprising a valve seat 12, cross ribs 13, and a guide 14 for the stem 14$^a$ of a disk check valve 15, which is limited in its drop or downward movement by the ribs 13. The valve stem 14$^a$ has an end seat 16 which is held against the cone stem 9 by water pressure against the bottom of the valve, and the cone stem 9 holds the valve removed from its seat in open position so as to permit a flow of water through the valve chamber and into a water chamber 17 between the freezing chamber 6 and the valve chamber.

The chamber 17 is provided with a water outlet 18, to which is coupled a vertical pipe 19 connecting the chamber 17 with a water pipe 20 leading into a house or building, and the pipe 19 is provided with a suitable stopcock 21. An induction pipe 22 is coupled to the lower end or mouth 23 of the casing 1 by such means as a screw bushing 24 for connecting the valve chamber with a water main or supply pipe 25. The pipes 19 and 22 are connected by a by-pass pipe 26 having a suitable valve or stopcock 27. In order to insulate or protect from freezing the lower portion of the casing and its contents, as well as the pipes connected with the casing, I inclose the same by a covering or jacket 28, such as asbestos or other suitable material, represented by dotted lines in Fig. 1 of the drawings so as not to obscure the inclosed parts. The jacket does not extend above the partition 7, so that the upper portion of the casing which forms the freezing chamber 6 is exposed above the jacket and is subjected to freezing temperature. The cone shape of the casing and of the cone shell affords greater space for water freezing under the shell than under the cover 5.

In operation, the by-pass valve being closed and the valve cock 21 being open, the check valve is held open and suspended with its stem against the cone stem 9 for the passage of water from the supply pipe through the valve chamber into the chamber 17 for supplying water to the house pipe. A sufficient amount of water passes from the chamber 17 through the ducts 7ᵃ to fill the freezing chamber 6, so that this body of water is maintained in the chamber 6 for freezing, whereupon the pressure upon the cone shell from expansion of the freezing water will force the shell outwardly and thereby either fracture or force the disk cap or cover from under the clamping ring, and permit the check valve to be closed by water pressure from the main supply pipe, thereby cutting off the water supply through the shell 1. The water service may be continued by closing the cock 21 and opening the by-pass valve, so that there may be no interruption in the water supply during the replacing and adjustment of the cone shell and the cover.

It will be seen that the cone shell as closed by the cover or cap plate 5 forms an air-tight chamber which increases the pressure of the cone on said plate or cover; that the partition plate prevents downward expansion of the ice as this plate wedges against the walls of the casing 1; that a certain amount of water passes through the central opening of the partition plate into the freezing chamber as the cone carries its stem into this chamber, and that this water gradually freezes around the cone stem and increases expansion pressure on the cone until the latter fractures or displaces the cover.

It will be observed that in the event of low water pressure the check valve is prevented from dropping and closing the induction pipe by the cross ribs in the valve chamber, and that the relative length of the cone stem and the valve stem is such as to keep the valve unseated or open until they are separated by the upward movement of the cone under water expansion in the freezing chamber.

Obviously, the parts may be expeditiously assembled in and removed from the casing for cleaning and repair as desired or as occasion may demand, and the casing may be conveniently interposed in the water service line between the usual stopcock and the waste water cut-off of a house by merely using suitable pipe sections connected by a by-pass pipe.

I do not wish to be understood as confining my invention to any particular size or material, nor to details of construction, nor in the application of the invention, but reserve the right to make such changes and variations in the manufacture and practical application thereof as may come within the scope of the appended claims.

Having thus described my invention, what I claim as new and desire to secure by Letters Patent is:

1. In an anti-freezing appliance for water pipes, a casing connected with the pipes, a casing cover adapted to be forced open by pressure within the casing, a valve within the casing and operated by water pressure, and means connecting the valve with the cover for preventing closure of the valve under said water pressure.

2. In an anti-freezing appliance for water pipes, a casing connected with induction and eduction pipes, a casing cover adapted to be displaced by pressure within the casing, a check valve within the casing and operated by water pressure from the induction pipe, and a cone held against the valve stem by the cover for holding the valve in open position.

3. In an anti-freezing appliance for water pipes, a casing connected with and between induction and eduction pipes, a partition dividing the casing into upper and lower chambers and having water ducts connecting the chambers, a water pressed valve below the lower chamber and having a stem projecting into the lower chamber, a device contained in the upper chamber and projecting through the partition for engagement with the valve stem, and a cover attached to the casing for maintaining said engagement.

4. In an anti-freezing appliance for water pipes, a casing adapted to be connected with and between induction and eduction pipes, a partition dividing the casing into upper and lower chambers and having water ducts connecting the chambers, a water pressed valve in the casing between the lower chamber and the induction pipe and having a stem projecting into the lower chamber, a displaceable cover attached to the casing, and means held by the cover and extending through the partition into engagement with the valve stem for holding the valve in open position.

5. In an anti-freezing appliance for water pipes, a casing, a partition dividing the casing into upper and lower chambers and having water ducts connecting the chambers, an induction valve chamber below the lower chamber and connected with an induction pipe, an eduction pipe connected with the lower chamber, a check valve loosely contained in the valve chamber and having a stem projecting into the lower chamber, a displaceable cover attached to the casing, an abutment held by the cover for the valve stem to maintain the valve in open position under induction water pressure pending the displacement of the cover.

6. The combination of a cone-shaped casing, a loose partition having water ducts and dividing the casing into an upper water freezing chamber and a lower water induction and eduction chamber, a valve suspended below the lower chamber under water induction pressure and having a stem projecting into the lower chamber, a cone shell within the upper chamber and having a stem projecting through the partition, and a cover attached to the casing and holding the cone stem against the valve stem for maintaining the valve in open position, said cover adapted to be displaced by expansion of the freezing water in the freezing chamber for permitting the valve to close.

7. In an anti-freezing device, a casing having an inlet and an outlet, a division dividing the casing into two chambers and permitting water to pass from one to the other of the chambers, a valve in the inlet, a displaceable cap for one of the chambers, and a movable member operated by freezing water in the capped chamber for displacing the cap so as to permit the valve to close the inlet.

8. An anti-freezing device comprising a casing, a member dividing the casing into two chambers one of which has an inlet and an outlet, a valve controlling the inlet, a displaceable cap for the other chamber, and a device between the cap and the valve for holding the latter in open position, said device being operated by freezing water for displacing the cap and permitting the valve to close.

In witness whereof I hereunto set my hand in the presence of two witnesses.

THOMAS A. DAVIS.

Witnesses:
W. T. BOYD,
W. T. SEIFERT.